United States Patent
Kim

(10) Patent No.: US 7,250,592 B2
(45) Date of Patent: Jul. 31, 2007

(54) IMAGE SENSOR WITH IMPROVED SENSITIVITY AND METHOD FOR DRIVING THE SAME

(75) Inventor: Young-Jin Kim, Ichon-shi (KR)

(73) Assignee: Hynix Semiconductor Inc. (KR)

( * ) Notice: Subject to any disclaimer, the term of this patent is extended or adjusted under 35 U.S.C. 154(b) by 145 days.

(21) Appl. No.: 10/876,916

(22) Filed: Jun. 25, 2004

(65) Prior Publication Data

US 2005/0139749 A1    Jun. 30, 2005

(30) Foreign Application Priority Data

Dec. 29, 2003   (KR) .................... 10-2003-0098552

(51) Int. Cl.
*H01J 40/14* (2006.01)
(52) U.S. Cl. ................................. 250/208.1; 250/214.1
(58) Field of Classification Search ............. 250/208.1, 250/214 A, 214.1, 226; 348/302–310, 246
See application file for complete search history.

(56) References Cited

U.S. PATENT DOCUMENTS

| | | | | |
|---|---|---|---|---|
| 5,721,422 A | * | 2/1998 | Bird ........................ | 250/208.1 |
| 6,654,057 B1 | * | 11/2003 | Rhodes ....................... | 348/294 |
| 6,756,576 B1 | * | 6/2004 | McElroy .................. | 250/208.1 |

* cited by examiner

*Primary Examiner*—Thanh X. Luu
*Assistant Examiner*—Tony Ko
(74) *Attorney, Agent, or Firm*—Blakely Sokoloff Taylor & Zafman

(57) ABSTRACT

There is provided an image sensor and a method for driving the same, in which fill-factor value is increased to improve a sensitivity of the image sensor. The image sensor includes a pixel array with M×N unit pixels in rows and columns, where M and N are a positive integer, and data output terminals of the unit pixels arranged on first and second column lines, which are adjacent to each other, are coupled to one common column bus.

3 Claims, 4 Drawing Sheets

IMAGE SENSOR WITH IMPROVED SENSITIVITY AND METHOD FOR DRIVING THE SAME

FIELD OF THE INVENTION

The present invention relates to an image sensor; and, more particularly, to a pixel array of a complementary metal oxide semiconductor (CMOS) image sensor.

DESCRIPTION OF RELATED ART

Generally, an image sensor is an apparatus to capture images using light sensing semiconductor materials. Since brightness and wavelength of light from an object are different in their amount according to the reflection area, electrical signals from pixels are different from one another. These electrical signals are converted into digital signals, which can be processed in a digital circuit, by an analog-to-digital converter.

For this purpose, the image sensor is provided with a pixel array having tens to hundreds of thousands of pixels, a converter for converting analog voltages into digital voltages, hundreds to thousands of storage devices, and so on.

FIG. 1 is a circuit diagram of a unit pixel, which is typically adopted in a CMOS image sensor.

Referring to FIG. 1, a unit pixel 100 consists of one photodiode and four transistors. The four transistors in the unit pixel 100 include a transfer transistor MT, a reset transistor MR, a drive transistor MD, and a select transistor MS. The transfer transistor MR transfers photoelectric charges generated in the photodiode 101 to a sensing node D and the reset transistor MR resets the sensing node D in order to sense a next signal. The drive transistor MD acts as a source follower and the select transistor MS outputs analogue data to an output terminal in response to address signals.

The CMOS image sensor having such unit pixels supports a correlated double sampling (hereinafter, referred to as a CDS) in order to generate images of high quality. In accordance with the CDS, the unit pixel 100 obtains a voltage corresponding to a reset level. Then, the unit pixel 100 obtains a data level voltage by reading out photoelectric charges generated in the photodiode 101. A difference between the reset level voltage and the data level voltage is calculated and outputted as an output image value of the image sensor.

FIG. 2 is a timing chart of control signals to control the transistors of the unit pixel shown in FIG. 1. The operation of the unit pixel 100 will be described with reference to FIG. 2.

a) In section "A", the transfer transistor MR and the transfer transistor MT are turned on while the select transistor MS is kept on a turned-off state, thereby making a fully depletion region in the photodiode 101. This means that the photodiode is reset.

b) In section "B", the turned-on transfer transistor MT is turned off, so that the photodiode 101 receives light from an object, generates photoelectric charges and integrates the photoelectric charges. Then, the select transistor MS is turned on, so that a reset voltage level of the sensing node D is outputted through a data output terminal data_out.

c) In section "C", the transfer transistor MT is turned on, so that data level voltage of the photodiode 101 is transferred to the sensing node D and stored therein. Then, the select transistor MS is turned on, so that the data level voltage is outputted through the data output terminal data_out.

Although not shown, a CDS circuit processes the data level voltage outputted through the data output terminal data_out. Since the process departs from the scope of this invention, its detailed description will be omitted.

FIG. 3 is a circuit diagram of a conventional pixel array.

Referring to FIG. 3, data output terminals data_out of unit pixels arranged on the same column line are coupled to one common column bus. Also, power supply voltage (VDD) terminals of the unit pixels arranged on the same column line are coupled to one common VDD line. In other words, in the pixel array having M×N unit pixels, data output terminals and VDD terminals of M unit pixels arranged on a first column line are coupled to a first column bus Column_bus1 and a first VDD line VDD1, respectively. Data output terminals and VDD terminals of M unit pixels arranged on a second column line are coupled to a second column bus Column_bus2 and a second VDD line VDD2, respectively.

Since such a pixel array includes the column bus and the VDD line at every column, there is a limit to an increase in a fill-factor value, thereby degrading the sensitivity of the image sensor. The Fill-factor is a factor that determines the sensitivity that is one barometer for performances of the image sensor and it is defined by a ratio of a whole area of pixel to a photodiode area.

SUMMARY OF THE INVENTION

It is, therefore, an object of the present invention to provide an image sensor and a method for driving the same, in which fill-factor value is increased to improve a sensitivity of the image sensor.

In an aspect of the present invention, there is provided an image sensor comprising a pixel array with M×N unit pixels in rows and columns, M and N being a positive integer, wherein data output terminals of the unit pixels arranged on first and second column lines, which are adjacent to each other, are coupled to one common column bus.

In another aspect of the present invention, there is provided a method for driving an image sensor comprising a pixel array with M×N unit pixels in rows and columns, M and N being a positive integer, wherein data output terminals of the unit pixels arranged on first and second column lines, which are adjacent to each other, are coupled to one common column bus, and power supply voltage (VDD) terminals of the unit pixels arranged on the first and second column lines are coupled to one common power supply line, the method comprising the steps of: generating photoelectric charges at a light sensing element; resetting respective sensing nodes of the unit pixels; outputting reset data of the sensing nodes of the unit pixels arranged on the first column line to the common column bus; outputting reset data of the sensing nodes of the unit pixels arranged on the second column line to the common column bus; transferring image data to the sensing nodes, wherein the image data correspond to the generated photoelectric charges; outputting the image data of the sensing nodes of the unit pixels arranged on the first column line to the common column bus; and outputting the image data of the sensing nodes of the unit pixels arranged on the second column line to the common column bus.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Hereinafter, the present invention will be described in detail with reference to the accompanying drawings.

Figure 4:
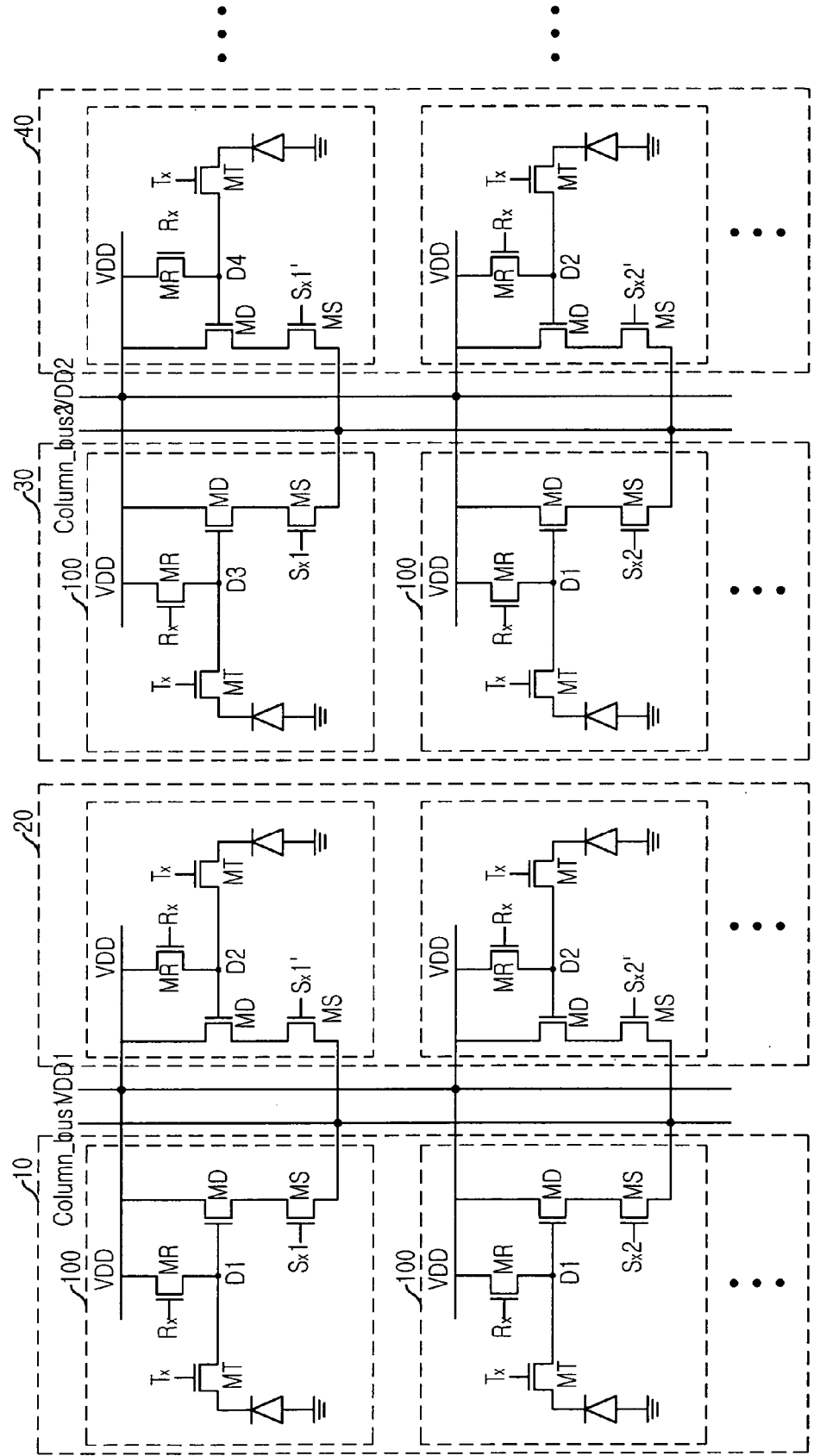
FIG. 4 is a circuit chart of a pixel array in accordance with an embodiment of the present invention.

FIG. 4 is a circuit diagram of a pixel array in accordance with an embodiment of the present invention.

Figure 1:
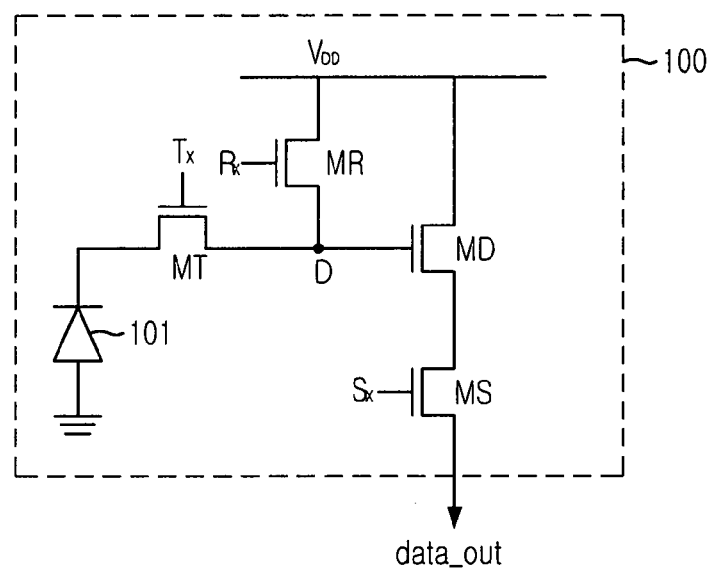
FIG. 1 is a circuit diagram of a unit pixel, which is typically adopted in a CMOS image sensor.
Figure 2:
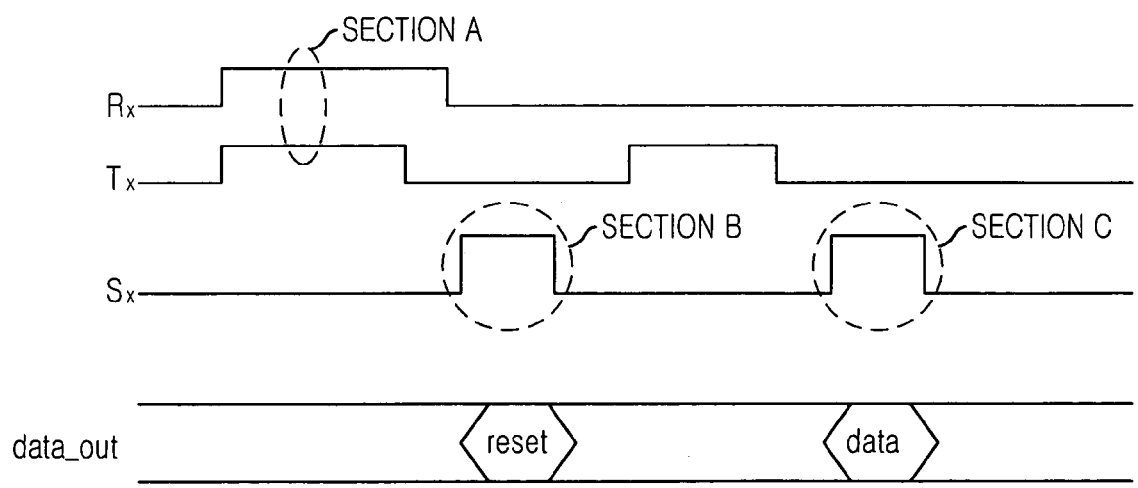
FIG. 2 is a timing chart illustrating control signal signals to control transistors of the unit pixel shown in FIG. 1.
Figure 3:
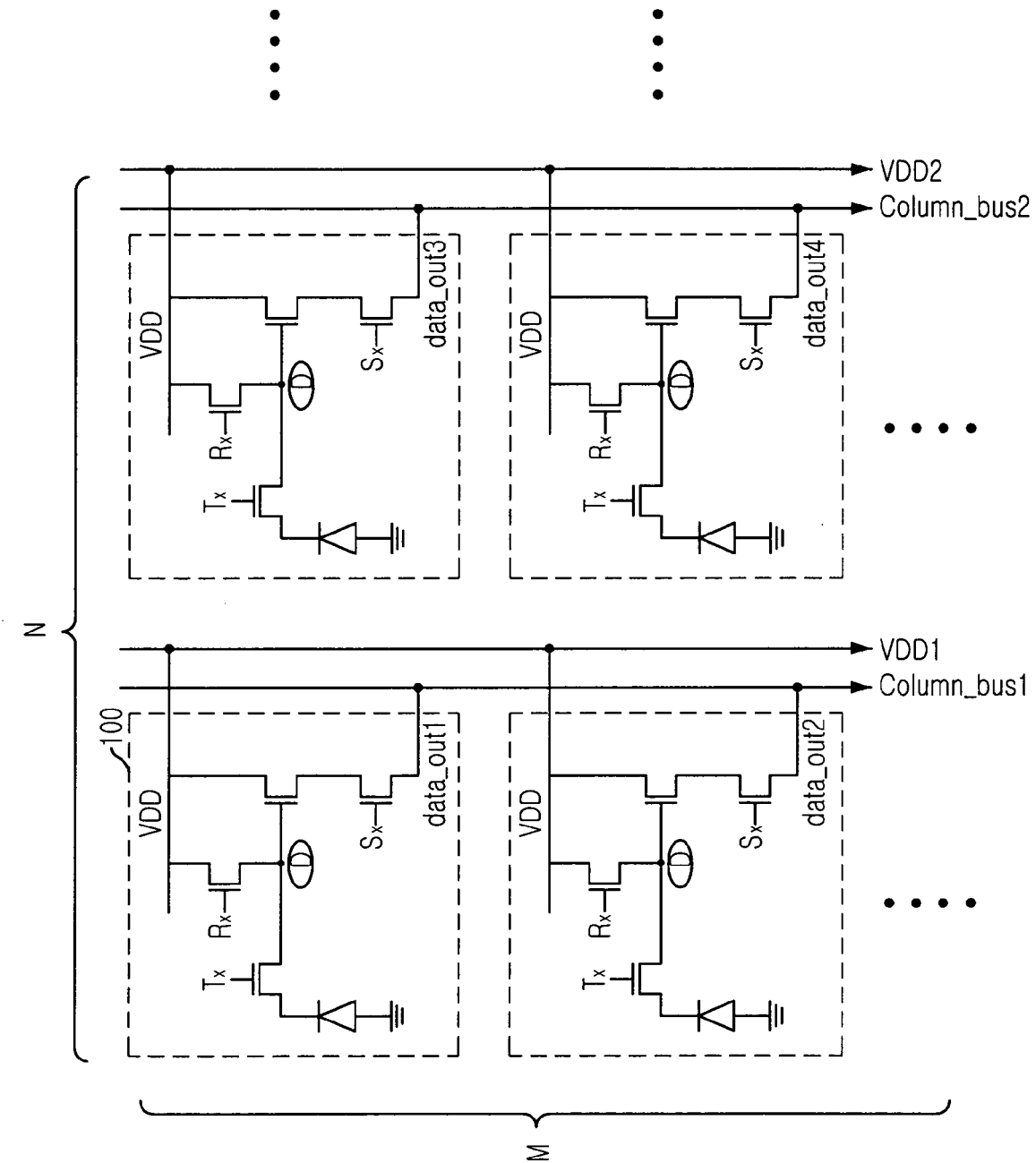
FIG. 3 is a circuit diagram of a conventional pixel array.

Referring to FIG. 4, data output terminals data_out of unit pixels arranged on two columns adjacent to each other are commonly coupled to one column bus. Also, VDD terminals of the unit pixels arranged on the two columns adjacent to each other are commonly coupled to one VDD line. In FIG. 4, an internal structure of each unit pixel 100 is identical to that of FIG. 1. The common VDD line is commonly coupled to one end of each reset transistor MR and drive transistor MD contained in each unit pixel, and the column bus is commonly coupled to one end (i.e., data_out) of each select transistor MS contained in each unit pixel.

In a pixel array with M×N unit pixels, data output terminals and VDD terminals of M×2 unit pixels arranged on first and second column lines, which are adjacent to each other, are commonly coupled to a first column bus Column_bus1 and a first VDD line VDD1, respectively. In the same manner, data output terminals and VDD terminals of M×2 unit pixels arranged on third and fourth column lines, which are adjacent to each other, are commonly coupled to a second column bus Column_bus2 and a second VDD line VDD2, respectively.

In this manner, one column bus and one VDD line are arranged at every second column line, so that unit pixels of two column lines share one column bus and one VDD line. Compared with the conventional pixel array, the pixel array of the present invention can reduce an area that is occupied by the column buses and the VDD lines. A photodiode area of the unit pixel can be widened as much as the reduced area, thereby increasing a fill-factor value. As a result, a sensitivity of the image sensor is improved.

Figure 5:
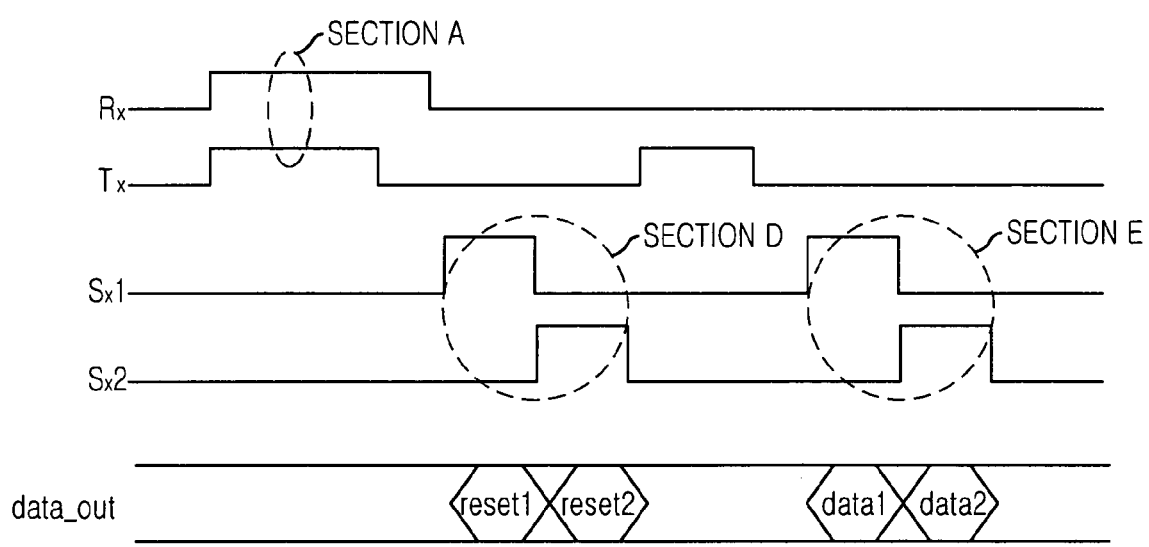
FIG. 5 is a timing diagram illustrating control signals to control the pixel array in accordance with an embodiment of the present invention.

FIG. 5 is a timing chart illustrating control signals to control the unit pixels of the pixel array in accordance with the present invention.

A method for driving the unit pixels of the pixel array in accordance with the present invention will be described in detail with reference to FIGS. 4 and 5.

a) In section "A", the reset transistor MR and the transfer transistor MT are turned on while the select transistor MS is kept on a turned-off state, thereby making a fully depletion region in the photodiode acting as a light sensing element.

b) In section "D", the turned-on transfer transistor MT is turned off, so that the photodiode receives light from an object, generates photoelectric charges and integrates the photoelectric charges. Then, the select transistor MS of the first column line 10 and the select transistor MS of the second column line 20 are sequentially turned on, so that respective reset voltage levels of sensing nodes D1 and D2 are sequentially outputted through the first column bus Column_bus1.

c) In section "E", the transfer transistor MT is turned on, so that data level voltages of the photodiodes are transferred to the sensing nodes D1 and D2 and stored therein. Then, the select transistor MS of the first column bus line 10 and the select transistor MS of the second column bus line 20 are sequentially turned on, so that respective data level voltages of the sensing nodes D1 and D2 are outputted through the first column bus Column_bus1.

As described above, the driving method of the present invention is similar to that of the prior art. However, since the unit pixels coupled to two column lines are commonly coupled to one column bus, the unit pixel data (reset and image data) of the first and second column lines are controlled to be sequentially outputted through the column line at predetermined time intervals.

According to the present invention, the unit pixels of two column lines are configured to share one column bus and one VDD line, which are arranged at every second column line. Thus, an area occupied by the column buses and the VDD lines is reduced to increase the photodiode area, thereby enhancing the sensitivity of the image sensor. In other words, if the photodiode area is increased, the fill-factor value influencing the sensitivity of the image sensor is also increased.

The present application contains subject matter related to Korean patent applications No. 2003-98552, filed in the Korean Patent Office on Dec. 29, 2003, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. An image sensor comprising a pixel array with M×N unit pixels in rows and columns, M and N being a positive integer, wherein data output terminals of unit pixels arranged on first and second column lines, which are adjacent to each other, are coupled to one common column bus, wherein each unit pixels includes:

a light sensing element for receiving light from an object to generate photoelectric charges;

a transfer means for selectively transferring the photoelectric charges from the light sensing element to a sensing node;

a reset means for resetting the sensing node;

a drive means having one end coupled to the common power supply line, for transferring and amplifying an electrical signal applied on the sensing node to transfer the selection means; and a select means for selectively outputting reset data or image data to the common column bus in response to a control signal, wherein each select means of the unit pixels arranged on the first column line is enabled to output the reset data or the image data to the common column bus and, after a predetermined period, each select means of the unit pixels arranged on the second column line is enabled to output the reset data or the image data to the common column bus, wherein power supply voltage (VDD) terminals of the unit pixels arranged on the first and second column lines are coupled to one common power supply line.

2. An image sensor comprising a pixel array with M×N unit pixels in rows and columns, M and N being a positive integer, wherein data output terminals of unit pixels arranged on first and second column lines, which are adjacent to each other, are coupled to one common column bus, wherein the unit pixel includes:
- a photodiode for receiving light from an object to generate photoelectric charges;
- a transfer transistor for selectively transferring the photoelectric charges from the photodiode to a sensing node;
- a reset transistor having one end coupled to the common power supply line, for resetting the sensing node;
- a drive transistor having one end coupled to the common power supply line, for amplifying an electrical signal applied on the sensing node and transferring the electrical signal to the select means; and
- a select means for selectively outputting reset data or image data to the common column bus in response to a control signal, wherein each select means of the unit pixels arranged on the first column line is enabled to output the reset data or the image data to the common column bus and, after a predetermined period, each select means of the unit pixels arranged on the second column line is enabled to output the reset data or the image data to the common column bus,
- wherein power supply voltage (VDD) terminals of the unit pixels arranged on the first and second column lines are coupled to one common power supply line.

3. A method for driving an image sensor comprising a pixel array with M×N unit pixels in rows and columns, M and N being a positive integer, wherein data output terminals of the unit pixels arranged on first and second column lines, which are adjacent to each other, are coupled to one common column bus, and power supply voltage (VDD) terminals of the unit pixels arranged on the first and second column lines are coupled to one common power supply line, the method comprising the steps of:
- generating photoelectric charges in response to light from an object by a light sensing element;
- resetting respective sensing nodes of the unit pixels;
- outputting reset data of the sensing nodes of the unit pixels arranged on the first column line to the common column bus and, after a predetermined period, outputting reset data of the sensing nodes of the unit pixels arranged on the second column line to the common column bus;
- transferring image data to the sensing nodes, wherein the image data correspond to the generated photoelectric charges; and
- outputting the image data of the sensing nodes of the unit pixels arranged on the first column line to the common column bus and, after a predetermined period, outputting the image data of the sensing nodes of the unit pixels arranged on the second column line to the common column bus in response to a control signal for controlling a select means included in each unit pixel.

* * * * *